UNITED STATES PATENT OFFICE.

CARL ADOLPH RESEN STEENSTRUP, OF COPENHAGEN, DENMARK, ASSIGNOR TO AKTIESELSKABET GUMMI - REGENERATIONS- SOCIETET, (SYSTEN RESEN - STEENSTRUP,) OF COPENHAGEN, DENMARK.

PROCESS FOR DEVULCANIZING INDIA-RUBBER.

No. 830,260.     Specification of Letters Patent.     Patented Sept. 4, 1906.

Application filed March 2, 1905. Serial No. 248,155.

*To all whom it may concern:*

Be it known that I, CARL ADOLPH RESEN STEENSTRUP, engineer, of 81 Vesterbrogade, Copenhagen, Denmark, have invented a certain new and useful Process for Devulcanizing India-Rubber, of which the following is a specification.

Attempts hitherto made to devulcanize india-rubber containing insertions have failed, and it has been necessary to separate the insertion from the rubber before subjecting the latter to the devulcanizing process.

The present invention relates to a process of devulcanization which does not require a preliminary separation process, and produces a rubber which can be used as a substitute for pure rubber without admixture of the latter for any of the purposes to which rubber is put. The waste rubber treated by this process, as well as the goods made therefrom, show the same homogeneous structure as those from unvulcanized rubber.

For the purpose of the invention the waste rubber is disintegrated in a suitable machine without preliminary separation and introduced into a lead-lined digester having a jacket and a stirrer. The mass is covered with an aqueous solution of an alkali or an alkaline earth or a mixture of both. While stirring, hydrofluoric acid is added, and the digester is tightly closed. Steam is then introduced into the jacket, and the mass is thus heated and continuously stirred for four to six hours. The pressure rises to six to eight atmospheres and is maintained thereat for four to six hours, during which the stirring is continued. The steam is now cut off, and when the pressure has fallen the cover of the digester is removed, and the pasty mass is jigged on a fine sieve and treated with water until the latter flows away clear. After this washing operation the mass is suspended and dried and is then ready for use.

The proportion of the alkali or alkaline earth to the waste rubber to be treated depends on the content of sulfur in the latter, and the proportion of hydrofluoric acid depends on the amount of fabric to be destroyed in the rubber.

If the fabric is present in only small proportion, the hydrofluoric acid may be obtained during the treatment in the digester from fluor-spar introduced into the latter. At the temperature and pressure employed the fluor-spar yields hydrofluoric acid. If, however, a considerable proportion of fabric is present, hydrofluoric acid as such must be added. For instance, waste rubber containing ten per cent. of sulfur and thirty per cent. of fabric insertion would require five per cent. of alkali or alkaline earth and about five per cent. of hydrofluoric acid. If the rubber contains ten per cent. of sulfur, but only one per cent. of fabric insertion, there may be added either five per cent. of alkali and one to two per cent. of hydrochloric acid, or three to four per cent. of alkali or alkaline earth and one to three per cent. of fluor-spar.

All sorts of alkalies or alkaline earths may be used in the method, it being serviceable, however, to use nitrates because, for one thing, they are the cheapest. To give an example, it may be mentioned that especially good results have been obtained by using a mixture of equal parts of hydrate of lime or calcium hydroxid, $Ca(HO)_2$, and nitrate of lime, $Ca(NO_3)_2 + 4H_2O$, and equally good result has been obtained by using a mixture of equal parts of hydrate of soda, $NaHO$, and nitrate of soda, $NaNO^3$, the latter mixture, however, being more expensive than the former.

Having thus fully described my invention, what I claim as new, and desire to secure by Letters Patent of the United States, is—

1. The process of devulcanizing india-rubber having fabric insertions, which consists in treating the material under action of heat with a devulcanizing agent and simultaneously with hydrofluoric acid as the agent for destruction of the fabric insertions.

2. The process of devulcanizing india-rubber having fabric insertions, which consists in disintegrating or dividing the material and treating the same under pressure with a solution of alkali or alkaline earth together with hydrofluoric acid, until the rubber is devulcanized and its fabric insertions destroyed, and then washing and drying the product.

3. The process of devulcanizing india-rubber having fabric insertions, which consists in adding to a divided or disintegrated mass of such material a solution of alkali or alkaline earth and hydrofluoric acid in sufficient quantities respectively to devulcanize the rubber and destroy its fabric insertions, and subjecting said mass together with said solution and acid to the action of heat in a closed vessel.

4. A process of devulcanizing india-rubber having fabric insertions, which consists in supplying an aqueous alkaline solution and hydrofluoric acid to the mass of divided india-rubber in a closed vessel, heating the mass and stirring the same for a protracted period required to devulcanize the rubber and destroy the fabric insertion, and afterward washing and drying the material.

In testimony whereof I have signed my name to this specification in the presence of two subscribing witnesses.

CARL ADOLPH RESEN STEENSTRUP.

Witnesses:
MARCUS MÓLLER,
MAGNUS JENSEN.